United States Patent [19]
Mitate

[11] Patent Number: 5,478,672
[45] Date of Patent: Dec. 26, 1995

[54] NONAQUEOUS SECONDARY BATTERY, POSITIVE-ELECTRODE ACTIVE MATERIAL

[75] Inventor: Takehito Mitate, Yamatotakada, Japan

[73] Assignee: Sharp Kabushiki Kaisha, Osaka, Japan

[21] Appl. No.: 362,936

[22] Filed: Dec. 23, 1994

[30] Foreign Application Priority Data

Dec. 24, 1993 [JP] Japan ..................... 5-328890

[51] Int. Cl.⁶ ............................. H01M 6/14; H01M 4/50
[52] U.S. Cl. ......................... 429/194; 429/224; 429/218
[58] Field of Search .................... 429/224, 218, 429/194; 423/49, 599

[56] References Cited

U.S. PATENT DOCUMENTS

| | | | |
|---|---|---|---|
| 4,567,031 | 1/1986 | Riley . | |
| 5,266,299 | 11/1993 | Tarascon | 423/599 |
| 5,316,877 | 5/1994 | Thackeray et al. | 429/224 X |
| 5,358,805 | 10/1994 | Fujimoto et al. | 429/218 |
| 5,401,599 | 3/1995 | Tahara et al. | 429/224 X |
| 5,418,090 | 5/1995 | Koksbang et al. | 429/224 |

FOREIGN PATENT DOCUMENTS

| | | |
|---|---|---|
| 55/136131 | 10/1980 | Japan . |
| 61/116758 | 6/1986 | Japan . |
| 61/116757 | 6/1986 | Japan . |
| 62/90863 | 4/1987 | Japan . |
| 62/256371 | 11/1987 | Japan . |
| 62/264560 | 11/1987 | Japan . |
| 63-114064 | 5/1988 | Japan . |
| 64/114065 | 5/1988 | Japan . |
| 1/246763 | 10/1989 | Japan . |
| 1/294362 | 11/1989 | Japan . |
| 1/307159 | 12/1989 | Japan . |
| 2/270268 | 11/1990 | Japan . |
| 3/64860 | 3/1991 | Japan . |
| 3/67464 | 3/1991 | Japan . |
| 3/108261 | 5/1991 | Japan . |
| 3/105858 | 5/1991 | Japan . |
| 3/110758 | 5/1991 | Japan . |
| 3/108262 | 5/1991 | Japan . |
| 3/110757 | 5/1991 | Japan . |
| 4/28162 | 1/1992 | Japan . |
| 4/14757 | 1/1992 | Japan . |
| 4155775 | 5/1992 | Japan . |
| 4/147573 | 5/1992 | Japan . |
| 4/141954 | 5/1992 | Japan . |
| 2251119 | 6/1992 | United Kingdom . |

OTHER PUBLICATIONS

Patent Abstracts of Japan, vol. 18, No. 573 (E–1624) 2 Nov. 1994 & JP-A-06 215 771 (Dowa Mining Co. Ltd.) 5 Aug. 1994.

Patent Abstracts of Japan, vol. 16, No. 204 (E-1202) 15 May 1992 & JP-A-04 033 259 (Sony Corp.) 4 Feb. 1992.

Ohzuku et al, "Electrochemistry of Manganese Dioxide in Lithium Nonaqueous Cell", Electrochemical Society Active Member, pp. 769–775 (Mar. 1990).

*Primary Examiner*—Anthony Skapars
*Attorney, Agent, or Firm*—Nixon & Vanderhye

[57] ABSTRACT

A nonaqueous secondary battery comprising: a positive electrode; a negative electrode; and a nonaqueous ion conductor; the negative electrode comprising an active material which contains lithium or enables lithium to intercalate/deintercalate or insertion/desertion; the positive electrode comprising an active material which is a lithium manganese composite oxide having an X-ray diffraction pattern using a CuKα-ray which shows at least three peaks in the ranges between 15.2° and 15.6°, between 18.6° and 18.8°, and between 24.5° and 25.1°, the ratio of a peak intensity in the range between 27° and 33° to a peak intensity in the range between 15.2° and 15.6° being less than 0.02.

14 Claims, 4 Drawing Sheets

NONAQUEOUS SECONDARY BATTERY, POSITIVE-ELECTRODE ACTIVE MATERIAL

BACKGROUND OF THE INVENTION

1. Field of the Invention

The present invention relates to a nonaqueous secondary battery, a positive-electrode active material and a process for producing the same. More particularly, it relates to a nonaqueous secondary battery having a negative electrode comprising an active material which contains lithium or enables lithium to intercalate/deintercalate or insertion/desertion, and a positive electrode comprising an active material which contains a lithium manganese composite oxide, and to a process for producing the positive-electrode active material.

2. Description of the Prior Art

With downsizing and energy saving of electronic devices, secondary batteries utilizing alkali metals such as lithium have been attracting more attention.

Where an alkali metal such as lithium alone is employed for the negative electrode of a secondary battery, a dendrite (branching tree-like crystal) appears and grows on the surface of an active material during a repeated charging and discharging process, i.e., during metal dissolution-deposition process. As a result, the dendrite may penetrate through a separator of the secondary battery and contact the positive electrode. This will result in a short circuit within the battery.

Further, if an alkali metal alloy is employed for the negative electrode, the growth of the dendrite can be suppressed, as compared with the case of the alkali metal alone, so that the charge-discharge cycle characteristics are improved. However, the generation of the dendrite on the surface of the active material cannot be completely prevented, and there still exists the problem of the short circuit within the secondary battery.

In recent years, carbon materials and organic materials (e.g., conductive polymers) for utilizing an alkali metal ion absorption-releace process have been employed for a negative electrode instead of alkali metals and alloys thereof for utilizing a dissolution-deposition process or dissolution-deposition diffusion in solid process. The use of these materials makes it possible to avoid the generation of the dendrite because of the operational principle, resulting in a remarkable decrease in short circuits within batteries.

For positive electrode, on the other hand, there have been attempts to employ vanadium pentaoxide, titanium disulfide, tungsten trioxide, manganese dioxide, lithium cobalt oxide ($LiCoO_2$), lithium nickel oxide ($LiNiO_2$), spinel-type lithium manganese oxide ($LiMn_2O_4$) and the like. Vanadium pentaoxide used for the positive electrode of a secondary battery serves as an active material in a charged state immediately after the synthesis thereof, as disclosed, for example, in Japanese Unexamined Patent Publications No. 61-116758 (1986), No. 61-116757 (1986), No. 1-246763 (1989) and No. 3-105858 (1991). In these patent applications, it is disclosed that a lithium secondary battery presenting a high voltage and having an improved charge-discharge cycle life can be obtained by using for the positive electrode an amorphous vanadium pentaoxide prepared by way of quick quenching.

Further, in Japanese Unexamined Patent Publications No. 55-136131 (1980), No. 62-90863 (1987), No. 62-25637 (1987), No. 62-264560 (1987), No. 3-64860 (1991), No. 4-28162 (1992) and No. 4-155775 (1992), it is disclosed that lithium cobalt oxide ($LiCoO_2$), lithium nickel oxide ($LiNiO_2$) or a composite oxide thereof, or a composition comprising any of such composite oxides and another element added thereto can be used as a positive-electrode active material presenting a high potential. Still further, it is proposed to obtain a lithium secondary battery presenting a high voltage by using an electrode containing such positive-electrode active materials. However, raw materials of these positive- electrode active materials are expensive and, hence, the production of batteries will be costly.

On the other hand, in Japanese Unexamined Patent Publications No. 63-114064 (1988), No. 63-114065 (1988), No. 1-294362 (1989), No. 1-307159 (1989), No. 3-67464 (1991), No. 3-108262 (1991), No. 3-110757 (1991) and No. 3-110758 (1991), there are disclosed composite oxides comprising relatively inexpensive manganese dioxide, manganese dioxide composition containing lithium or a composite oxide including manganese dioxide and another element added thereto. These substances each serve as an active material in a charged state only immediately after the synthesis thereof. Therefore, in the case that a lithium intercalation/deintercalation carbon material, graphite or the like which is in an initial discharged state is used as a negative-electrode active material in combination with the aforesaid positive-electrode active material, it becomes necessary to discharge the positive electrode or to charge the negative electrode in the initial stage, thereby necessitating an additional step in the battery production process.

Further, a spinel-type lithium manganese oxide ($LiMn_2O_4$) and a composite oxide comprising the same and another element added thereto are disclosed in T. Ohsuku, M. Tagawa, T. Hirai, J. Electrochem. Soc., 137, 769 (1990), Japanese Unexamined Patent Publications No. 2-270268 (1990), No. 3-108261 (1991), No. 4-14757 (1992), No. 4-141954 (1992) and No. 4-147573 (1992). Although the aforementioned problems can be overcome by using these composite oxides, there still exist problems that the potential thereof is so high as to cause easy decomposition of electrolytic solution and material, and that only low charge-discharge capacity is expected.

SUMMARY OF THE INVENTION

In accordance with one aspect of the present invention, there is provided a nonaqueous secondary battery comprising a positive electrode, a negative electrode, and a nonaqueous ion conductor, the negative electrode comprising an active material which contains lithium or enables lithium to intercalate/deintercalate or insertion/desertion, the positive electrode comprising an active material which is a lithium manganese composite oxide having an X-ray diffraction pattern using a CuKα-ray which shows at least three peaks in the ranges between 15.2° and 15.6°, between 18.6° and 18.8°, and between 24.5° and 25.1°, the ratio of a peak intensity in the range between 27° and 33° to a peak intensity in the range between 15.2° and 15.6° being less than 0.02.

In accordance with another aspect of the present invention, there is provided a positive electrode comprising an active material which is a lithium manganese composite oxide having an X-ray diffraction pattern using a CuKα-ray which shows at least three peaks in the ranges between 15.2° and 15.6°, between 18.6° and 18.8°, and between 24.5° and 25.1°, the ratio of a peak intensity in the range between 27° and 33° to a peak intensity in the range between 15.2° and 15.6° being less than 0.02.

In accordance with still another aspect of the present invention, there is provided a process for producing an active material for a positive electrode of the aforesaid nonaqueous secondary battery, comprising the steps of: mixing a manganese inorganic compound with a lithium organic or inorganic compound to prepare a lithium manganese compound mixture; and calcinating the lithium manganese compound mixture under the condition at a temperature between about 400° C. and about 2000° C. in an oxidizing or inert atmosphere containing substantially 0% to about 10% by volume of oxygen to obtain lithium manganese composite oxide.

In accordance with another aspect of the present invention, there is provided a process for producing an active material for a positive electrode of the aforesaid nonaqueous secondary battery, comprising the steps of: mixing a manganese inorganic compound with a lithium organic or inorganic compound to prepare a lithium manganese compound mixture; and calcinating the lithium manganese compound mixture under the condition at a temperature of about 250° C. or higher in a reducing atmosphere to obtain lithium manganese composite oxide.

As can be understood from the foregoing, known positive-electrode active materials suffer respective problems and, therefore, it has been desired to provide a nonaqueous secondary battery, particularly a lithium secondary battery, employing a novel positive-electrode active material.

It is, therefore, an object of the present invention to provide a nonaqueous secondary battery which can be manufactured through a relatively simplified production process dispensing with a conventionally required production step of discharging a positive electrode or charging a negative electrode, and to provide a process for producing a positive-electrode active material for use in the secondary battery.

It is another object of the present invention to provide an improved nonaqueous secondary battery in which a dendrite can be prevented during a repeated charging and discharging process even if a negative electrode comprising a lithium intercalation/deintercalation or insertion/desertion carbon material, graphite or the like is combined with a positive electrode comprising a lithium manganese composite oxide.

DETAILED DESCRIPTION OF THE PREFERRED EMBODIMENT

Figure 1:
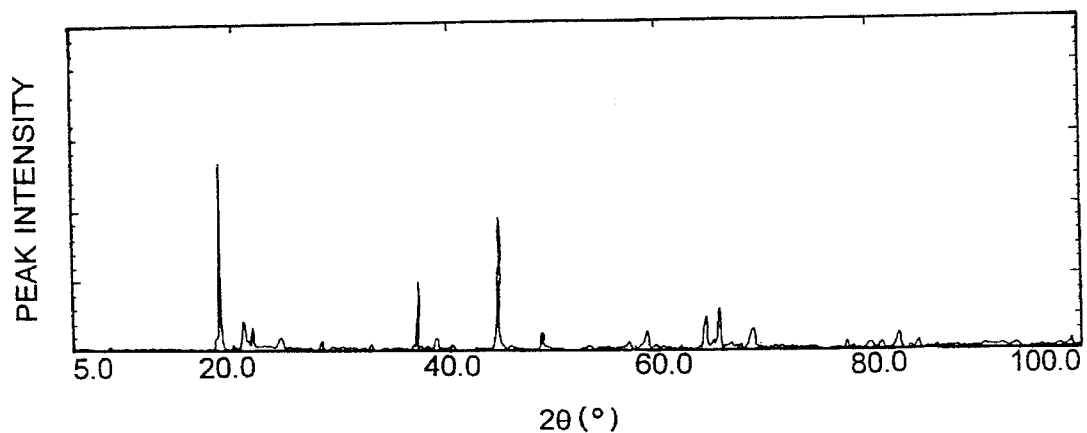
FIG. 1 is a graphic representation showing an X-ray diffraction pattern of $Li_{2.1}MnO_{3.0}$ which is a starting material for the synthesis of a positive-electrode active material in accordance with EXAMPLE 1 of the present invention.

The positive electrode of a nonaqueous secondary battery according to the present invention contains a lithium manganese composite oxide as an active material. The lithium manganese composite oxide can be prepared by mixing a first group of a manganese inorganic compound with a second group of a lithium inorganic or organic compound, and then calcinating the mixture at a temperature of about 400° C. to about 2000° C. in an oxidizing or inert atmosphere containing substantially 0 vol % to about 10 vol % of oxygen. The lithium manganese composite oxide can be otherwise obtained by calcinating the aforesaid mixture at a temperature of about 250° C. or higher in a reducing atmosphere. The lithium manganese composite oxide thus obtained satisfies the following composition formula:

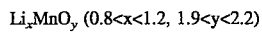

$Li_xMnO_y$ (0.8<x<1.2, 1.9<y<2.2)

The first group of the manganese inorganic compounds includes manganese oxides such as $MnO_2$ of α-type, β-type, δ-type, γ-type, ε-type, η-type, λ-type, electrolytic type and Ramsdellite type, $Mn_5O_8$, $Mn_2O_3$, MnOOH and $LiMn_2O_4$. Though manganese oxides other than those of the aforesaid first group may be also employed, it is required that trivalent or higher valent manganese constitutes the majority in the lithium manganese composite oxide. If this requirement is satisfied, the lithium manganese composite oxide has excellent characteristics required for a negative-electrode active material. However, monovalent or divalent manganese is hard to turn into trivalent or higher valent manganese because it is oxidized by calcination in the atmosphere containing substantially 0 vol % to 10 vol % of oxygen. Therefore trivalent or higher valent manganese should constitute the majority of the starting material for the positive-electrode active material. If monovalent or divalent manganese oxide is calcinated under the aforesaid conditions, the X-ray diffraction pattern of the resultant compound can hardly satisfy the peak requirements.

The second group of the lithium inorganic or organic compounds includes lithium halides such as lithium chloride, lithium bromide and lithium iodide; lithium hydroxide: lithium oxide; lithium salts of inorganic acids such as lithium nitrate and lithium carbonate; lithium salts of organic acids such as lithium formate, lithium acetate, lithium lactate, lithium citrate, lithium oxalate, lithium benzoate, lithium pyruvate, lithium stearate and lithium tartrate; and $Li_2MnO_3$.

At least one manganese compound selected from the first group and at least one lithium compound selected from the second group are mixed at a mixing ratio such that the composition ratio of lithium to manganese in the resultant lithium manganese composite oxide is in the range between 0.8:1 and 1.2:1 and that of manganese to oxygen is in the range between 1:2.2 and 1:1.9. The mixing amount of the first group of the manganese oxide and the second group of the lithium compound is appropriately determined depending on the composition ratio of a lithium manganese composite oxide to be obtained, calcination conditions and a vessel to be used in the calcination. If the resultant lithium manganese composite oxide has composition ratios out of the aforesaid ranges, the X-ray diffraction pattern of the composite oxide may not have peak intensities in the required ranges. Further, if such lithium manganese composite oxide is employed for the positive electrode of the nonaqueous secondary battery, the secondary battery will have a high resistance and polarization at the electrode. This results in an impractical secondary battery of low discharge capacity.

The mixing may be carried out by either a dry process or a wet process. If the manganese oxide of the first group and the lithium compound of the second group are both in powdered form, they are blended using a blender or the like mixing apparatus. If either one of the compounds is soluble in a solvent such as water, the other insoluble compound is dispersed into and fully mixed with the solution of the soluble compound. If the compounds are both soluble in a solvent, the solutions of the respective compounds are fully mixed with each other. In the latter two cases, the solvent can be removed by way of evaporation or cooling, if necessary.

The calcination of the lithium manganese compound mixture can be carried out in an atmosphere with the oxygen content thereof ranging from substantially 0 vol % to about 10 vol %, preferably from 0 vol % to about 5 vol %. The substantially 0 vol % oxygen content means an oxygen concentration of several ppb or lower, i.e., inert atmosphere. To produce the atmosphere with an oxygen content of about 10 vol % or less, the pressure is reduced to a substantially vacuum state, the air is replaced with an inert gas such as argon or nitrogen, or the like measures are taken. If the calcination is carried out in an atmosphere with greater than about 10 vol % oxygen content, the X-ray diffraction pattern of the resultant lithium manganese composite oxide may not have peak intensities in the required ranges. If such lithium manganese composite oxide is employed for the positive-electrode of the nonaqueous secondary battery, the secondary battery will have a high electrode resistance and polarization at the electrode. This results in an impractical secondary battery of low discharge capacity.

The calcination temperature is preferably in the range between about 400° C. and about 2000° C. If the calcination temperature is lower than about 400° C., the resultant composite oxide has a low crystallinity, and the X-ray diffraction pattern thereof does not have peak intensities in the required ranges. Therefore, such composite oxide is not suitable for practical use as the positive-electrode active material for the nonaqueous secondary battery. A calcination temperature of higher than about 2000° C. is not economically preferable.

The aforesaid lithium manganese compound mixture may be otherwise calcinated in a reducing atmosphere. Exemplary reducing atmospheres include single-component atmospheres such as of hydrogen, hydrocarbons and other organic compounds (for example, methane, ethane, propane, butane, ethylene, propylene, 2-butyne, acetylene, biphenyl, biphenylacetylene, benzene, toluene, xylene, naphthalene, anthracene, hexamethylbenzene, cyclohexane, pyrene, pyridine, arylbenzene, aniline, phenol, 1,2-dibromoethylene, styrene, acrylonitrile, pyrrole, thiophene, butylchloride, pentanol, anisole, acetone, ethyl lactate, etc.), and multi-component atmospheres such as of gas mixtures in which hydrogen or any of the aforesaid hydrocarbons or organic compounds is mixed with such an inert gas as nitrogen, argon or helium. The aforesaid hydrocarbons or organic compounds exist in various phases, i.e., gas, liquid and solid at room temperature. Therefore, the feeding method varies depending on the kind of the hydrocarbons or organic compounds to be used. For example, hydrogen, ethane, propane and the like which are available in a gas phase from a gas cylinder can be directly fed into the atmosphere along with such inert gas as argon or nitrogen. On the other hand, benzene, toluene, styrene, aniline, pyrrole, pentanol, anisole, acetone, ethyl butyrate, etc., which are in a liquid phase at room temperature, and biphenyl, etc., which are in a solid phase at room temperature but are in a liquid phase at elevated temperatures, can be fed into the atmosphere by way of bubbler or evaporation. Naphthalene, anthracene, etc., which are in a solid phase at room temperature, can be fed into the atmosphere by blending with manganese oxide of the first group and lithium compound of the second group or through sublimation.

In the case of reducing atmosphere of hydrogen, the hydrogen content thereof is preferably in the range between more than 0 vol % to about 30 vol %, and the calcination temperature is preferably about 250° C. to about 2000° C. If the hydrogen content in the atmosphere for the calcination is greater than about 30 vol %, the reduction is excessively proceeds, so that the X-ray diffraction pattern of the resultant composite oxide may not have the peak intensities in the required ranges. Therefore, such composite oxide is not suitable for practical use as the positive-electrode active material for the nonaqueous secondary battery. If the calcination temperature is lower than about 250° C., the resultant composite oxide has a low crystallinity, and the X-ray diffraction pattern thereof does not have the peak intensities in the required ranges. On the other hand, a calcination temperature of higher than about 2000° C. is not economically preferable.

In the case of reducing atmosphere of propane, the propane content thereof is preferably in the range between more than 0 vol % to about 50 vol %, and the calcination temperature is preferably about 300° C. to about 2000° C. The propane content of greater than about 50 vol % in the atmosphere for the calcination is not preferable, because the resultant lithium manganese composite oxide is contaminated with carbon generated by pyrolysis of propane in a gas phase. If the calcination temperature is lower than about 300° C., the resultant composite oxide has a low crystallinity, and the X-ray diffraction pattern thereof may not have peak intensities in the required ranges. Therefore, such composite oxide is not practical. On the other hand, a calcination temperature of higher than about 2000° C. is not economically preferable.

Where the lithium manganese composite oxide is synthesized by mixing the manganese oxide of the aforesaid first group and the lithium compound of the second group with such a compound as naphthalene or anthracene which is in a solid phase at room temperature, the feeding volume and calcination temperature may vary depending on the volume of a furnace and the vapor pressure and other properties of a compound to be used.

The X-ray diffraction pattern of the aforesaid lithium manganese composite oxide in the range of diffraction angle $2\theta$ between 0° and 50° obtained by way of the ordinary powder X-ray diffraction analysis by using CuK$\alpha$-ray as an X-ray source should have peaks at least in the ranges between 15.2° and 15.6°, between 18.6° and 18.8° and between 24.5° and 25.1°, and the ratio of a peak intensity observed in the range between 27° and 33° to that observed in the range between 15.2° and 15.6° should be lower than 0.02. The peak observed in the range between 15.2° and 15.6° represents (010) plane of orthorhombic Pmnm type $LiMnO_2$ and (010) plane of orthorhombic Pm2m type $LiMnO_2$. The peak observed in the range between 18.6 and 18.8 represents (111) plane of spinel-type $LiMn_2O_4$ and (002) plane of monoclinic $Li_2MnO_3$. The peak observed in the range between 24.5° and 25.1° represents (110) plane of Pmnm type $LiMnO_2$ and (011) plane of Pm2m type $LiMnO_2$. Other than the aforesaid peaks, the X-ray diffraction pattern may have peaks around 35.6°, 36.9°, 37.6°, 39.4°, 40.8°, 42.6°, 45.1° and 47.4°. If the X-ray diffraction pattern has peaks around the aforesaid diffraction angles, the ratios ($I/I_0$) of peak intensities (I) observed in the ranges between 18.6° and 18.8° and between 24.5° and 25.1°, and around 35.6°, 36.9°, 37.6°, 39.4°, 40.8°, 42.6°, 45.1° and 47.4° to the peak intensity ($I_0$) observed in the range between 15.2° and 15.6° are preferably between about 0.02 and about 1.5, between about 0.7 and about 0.2, between about 0.15 and about 0.3, between about 0.05 and about 0.25, between about 0.05 and about 0.2, between about 0.45 and about 0.75, between about 0.05 and about 0.3, between 0 and about 0.15, between about 0.55 and about 1.1, and between 0 and about 0.05, respectively. The peak positions and peak intensities appearing in the aforesaid X-ray diffraction pattern vary depending on the kinds of the manganese oxide of the first group and the lithium compound of the second group which are starting materials of the lithium manganese composite oxide, mixing ratio thereof, oxygen content in the atmosphere for the calcination and calcination temperature. This is because the crystallinity and crystal size of the lithium manganese composite oxide vary depending on these conditions. Under any condition, the X-ray diffraction pattern of the lithium manganese composite oxide serving as an excellent positive- electrode active material is required to have peaks in the ranges between 15.2° and 15.8°, between 18.8° and 18.8°, and between 24.5° and 25.1°, with the ratio of the peak intensity observed in the range between 27° and 33° to that observed in the range between 15.2° and 15.8° being lower than about 0.02.

In the X-ray diffraction pattern of the lithium manganese composite oxide, the ratio of the peak intensity observed in the range between 18.8° and 18.8° to that observed in the range between 15.2° and 15.8° is preferably from about 0.02 to about 1.5, more preferably from about 0.02 to about 1.0, most preferably from about 0.02 to about 0.4. It is difficult to obtain a lithium manganese composite oxide having a peak intensity ratio of lower than about 0.02 for this peak combination, if the composite oxide is prepared in accordance with the aforesaid production process. Further, a lithium manganese composite oxide having a peak intensity ratio of higher than 1.5 for this peak combination is not suitable for the practical use as the positive-electrode active material for the nonaqueous secondary battery. Still further, if the peak intensity ratio is higher than 1.0, faint intensity peaks may appear around 20.8°, 21.8°, 28.1°, 32.6°, 36.2°, 38.7°, 44.0°, 44.7° and 49.0° in the X-ray diffraction pattern. In a very rare case, a lot of extremely faint intensity peaks may appear, if the peak intensity ratio exceeds 0.4. The presence of these peaks depends on the kinds of the manganese oxide of the first group and the lithium compound of the second group, mixing ratio thereof, oxygen content in the atmosphere for the calcination, and calcination temperature, because the crystallinity and crystal size of the lithium manganese composite oxide are determined by these conditions.

The positive electrode can be fabricated by employing as the positive-electrode active material the lithium manganese composite oxide thus synthesized, which is blended with such materials as a conductive material, binder and/or, if necessary, solid electrolyte. Examples of conductive materials include such carbon materials as acetylene black, a graphite powder and a metal powder, but not limited thereto. Examples of binders include such fluorine-based polymers as polytetrafluoroethylene and polyvinylidene fluoride, and such polyolefin polymers as polyethylene and polypropylene, but not limited thereto. The mixing ratio is usually about 5 to 50 parts by weight of the conductive material and about 1 to 30 parts by weight of the binder with respect to 100 parts by weight of the active material. If the ratio of the conductive material is less than 5 parts by weight, a practical lithium secondary battery cannot be fabricated, because the resistance or polarization of the electrode is increased and the discharging capacity is decreased. If the ratio of the conductive material is greater than 50 parts by weight (which may vary depending on the conductive material to be blended), the discharge capacity of the positive electrode is undesirably reduced, because the absolute amount of the active material contained in the electrode is reduced. If the ratio of the binder is less than 1 part by weight, the binding ability is lost. If the ratio of the binder is greater than 30 parts by weight, the absolute amount of the active material contained in the electrode is reduced. Therefore, the resistance or polarization of the electrode is increased, and the discharge capacity thereof is undesirably reduced, thereby making the lithium secondary battery impractical.

Examples of negative-electrode active materials used in the nonaqueous secondary battery of the present invention include metal lithium, lithium alloys such as lithium aluminum, materials which can be doped or dedoped with lithium ion such as conductive polymers (polyacetylene, polythiophene, poly-p-phenylene, etc.), pyrolyzed carbon materials, carbon materials pyrolyzed in a gas phase in the presence of a catalyst, carbon materials obtained by carbonizating pitch, coke, tar and the like, and carbon materials obtained by carbonizing such polymers as cellulose and phenolic resin, graphites (natural graphite, artificial graphite, expansive graphite, etc.) which can be intercalated and deintercalated with lithium ion, and inorganic compounds ($WO_2$, $MoO_2$, etc.) which allows insertion and desertion of lithium ion. These materials may be used either single or as a composite thereof. Among these negative-electrode active materials, the pyrolyzed carbons, carbon materials obtained by carbonizating pitch, coke, tar and the like, carbon materials obtained by carbonizating polymers, and graphites (natural graphite, artificial graphite, expansive graphite, etc.) are preferable for fabricating the nonaqueous secondary battery in terms of battery characteristics and safety considerations.

Examples of ion conductors used in the nonaqueous secondary battery of the present invention include organic electrolytic solutions, polymer solid electrolytes, inorganic solid electrolytes, and molten salts. Among these ion conductors, the organic electrolytic solutions are preferable. The organic electrolytic solutions each can be prepared by dissolving an organic electrolyte in a solvent. Examples of specific solvents include such esters as propylene carbonate, ethylene carbonate, butylene carbonate, diethyl carbonate, dimethyl carbonate, methylethyl carbonate and γ-butyrolactone, such substituted tetrahydrofurans as tetrahydrofuran and 2-methyltetrahydrofuran, such ethers as dioxolane, diethyl ether, dimethoxyethane, diethoxyethane and methoxyethoxyethane, dimethylsulfoxide, sulfolane, methylsulfolane, acetonitrile, methyl formate, and methyl acetate, but not limited thereto. These solvents may be used either alone or in combination. Examples of specific electrolytes include such lithium salts as lithium perchlorate, lithium borofluoride, lithium hexafluorophosphate, lithium hexafluoroarsenate, lithium trifluoromethanesulfonate, lithium halides and lithium chloroaluminate, but not limited thereto. These electrolytes may be used either alone or in combination. The organic electrolyte solution is preferably dehydrated by using activated alumina, metal lithium or the like. The moisture content of the electrolyte is preferably less than 1000 ppm, more preferably 500 ppm, most preferably 100 ppm. Instead of carrying out this dehydration process, preliminarily dehydrated solute and solvent may be used.

The nonaqueous secondary battery of the present invention is fabricated by bonding a collector such as made of nickel mesh, if necessary, onto the aforesaid positive electrode and negative electrode and then attaching external electrodes thereto. Further, an electrolyte may be interposed between the positive electrode and negative electrode, and a separator such as made of polypropylene or polyethylene may be optionally disposed intermediate the electrodes. It is desired to provide a packing or hermetic seal such as made of polypropylene or polyethylene around the external electrodes respectively attached onto the positive electrode and negative electrode to prevent the external electrodes from contacting each other. Preferably, the aforesaid battery production process is carried out in an atmosphere of an inert gas such as argon or in an extremely dry atmosphere, which is separate from outside to prevent moisture invasion.

The nonaqueous secondary battery and the process for producing positive-electrode active material thereof according to the present invention will be described below by way of EXAMPLEs and COMPARATIVE EXAMPLEs.

EXAMPLE 1

Synthesis of positive-electrode active material

Lithium carbonate and manganese dioxide (IC No. 5) were mixed in a mortar in a weight ratio of Li:Mn=2.3:1. The mixture was formed into a pellet by applying a pressure of 100 kg/cm$^2$ thereto. The pellet was calcinated in the air at a temperature of 800° C. for five hours to synthesize $Li_{2.1}MnO_{3.0}$ which was to be used as one of the starting materials of the positive-electrode active material. The product thus synthesized was identified as $Li_2MnO_3$ through X-ray diffraction analysis (see FIG. 1).

Figure 2:
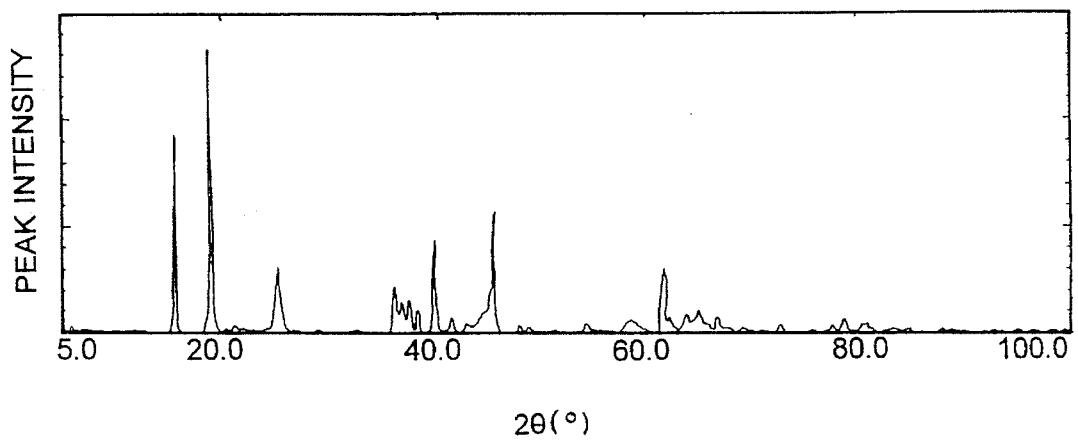
FIG. 2 is a graphic representation showing an X-ray diffraction pattern of a positive-electrode active material $Li_{1.1}MnO_{2.1}$ prepared in accordance with EXAMPLE 1 of the present invention.

A commercially available $Mn_2O_3$ and $Li_{2.1}MnO_{3.0}$ thus synthesized were mixed in a mortar in a weight ratio of Li:Mn=1.3:1. The mixture was put in a tableting instrument, and formed into a pellet by applying a pressure of 150 kg/cm$^2$ thereto. The pellet was calcinated in a nitrogen atmosphere containing 7 vol % oxygen at a temperature of 800° C. for three hours to obtain a positive-electrode active material $Li_{1.1}MnO_{2.1}$. The powder X-ray diffraction analysis was carried out on this active material by using CuKα-ray as an X-ray source. The X-ray diffraction pattern in the range of diffraction angle 2θ between 5° and 100° was as shown in FIG. 2. Peaks between 10° and 50° were observed at 15.5°, 18.8°, 21.0°, 22.0°, 25.0°, 35.7°, 36.4°, 37.1°, 37.7°, 39.5°, 41.0°, 42.6°, 45.3°, 47.6° and 48.2°, and the ratios (I/I$_0$) of peak intensities observed at these peak positions to a peak intensity observed at 15.5° were 1.0, 1.4, 0.06, 0.05, 0.34, 0.23, 0.19, 0.20, 0.13, 0.47, 0.10, 0.07, 0.60, 0.04 and 0.04, respectively.

Preparation of positive electrode

The positive-electrode active material thus obtained, acetylene black and polytetrafluoroethylene were mixed in a mortar in a weight ratio of 100:10:5. The mixture was formed into a pellet having a diameter of 20 mm and a weight of 0.25 g by way of pressure molding. At this time, a titanium mesh for use as a collector was embedded in the pellet, and then a titanium wire was spot-welded to the titanium mesh collector. The pellet was dried at a temperature of 200 ° C. under a reduced pressure to remove moisture. Thus, a positive electrode was prepared for the evaluation of the performance thereof.

Evaluation of positive electrode

The performance of the positive electrode was evaluated by way of three-electrode method using lithium electrode as a counter electrode and reference electrode. Used as an electrolytic solution was a solution in which lithium perchlorate was dissolved in a concentration of 1 mol/l in propylene carbonate. In the first charge-discharge cycle, the positive electrode was charged at a current density of 5 mA/g up to 4.1 V, and then discharged at the same current density to 2.0 V. This charge-discharge cycle was thereafter repeated.

As a result, the discharge capacity and average potential observed in the second charge-discharge cycle for the $Li_{1.1}MnO_{2.1}$ positive electrode thus prepared were 108 mAh/g and 2.86 V, respectively.

EXAMPLE 2

Synthesis of positive-electrode active material

Figure 3:
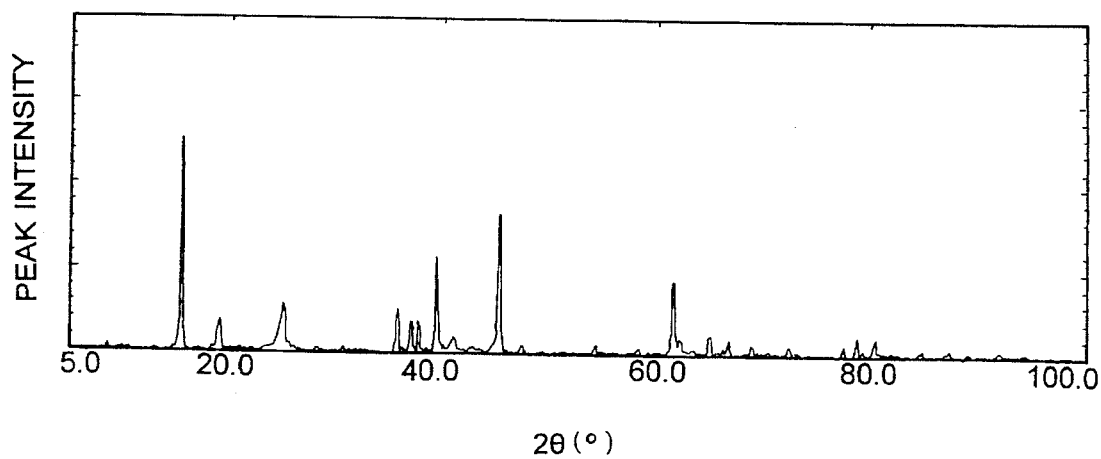
FIG. 3 is a graphic representation showing an X-ray diffraction pattern of a positive-electrode active material $LiMnO_2$ prepared in accordance with EXAMPLE 2 of the present invention.

Manganese dioxide (IC No. 5) and lithium hydroxide were mixed in a mortar in a weight ratio of Li:Mn=1:1, and the mixture was formed into a pellet in the same manner as in EXAMPLE 1. The pellet was calcinated in a nitrogen atmosphere at a temperature of 700° C. for three hours to obtain a positive-electrode active material $LiMnO_2$. The powder X-ray diffraction analysis was carried out on this active material by using CuKα-ray as an X-ray source. The X-ray diffraction pattern in the range of diffraction angle 2θ between 5° and 100° was as shown in FIG. 3. Peaks between 10° and 50° were observed at 15.4°, 18.7°, 24.6°, 35.6°, 36.9°, 37.6°, 39.4°, 40.8°, 42.5°, 45.1°, and 47.4°, and the ratios (I/I$_0$) of peak intensities observed at these peak positions to a peak intensity observed at 15.4° were 1.0, 0.15, 0.25, 0.22, 0.14, 0.16, 0.51, 0.07, 0.05, 0.67, and 0.05, respectively.

Preparation of positive electrode

A pellet-form positive electrode having a diameter of 20 mm and a weight of 0.25 g was prepared in substantially the same manner as in EXAMPLE 1, except that the positive-electrode active material thus obtained, acetylene black and polytetrafluoroethylene were mixed in a ratio of 100:20:15.

Evaluation of positive electrode

The performance of the positive electrode was evaluated in substantially the same manner as in EXAMPLE 1, except that an electrolytic solution was used in which lithium trifluoromethanesulfonate was dissolved in a concentration of 0.5 mol/l in a solvent mixture containing γ-butyrolactone and dimethoxyethane in a ratio of 1:1.

As a result, the discharge capacity and average potential observed in the second charge-discharge cycle for the $LiMnO_2$ positive electrode thus prepared were 121 mAh/g and 2.72 V, respectively.

EXAMPLE 3

Synthesis of positive-electrode active material

Manganese dioxide (IC No. 5) was added to a 5% lithium acetate aqueous solution in a weight ratio of Li:Mn=1:1, and water was evaporated at a temperature of 80° C. to 100° C. Then, the residue was pulverized in a mortar to obtain a powdered mixture in a mortar. The powdered mixture was formed into pellet in the same manner as in EXAMPLE 1.

Figure 4:
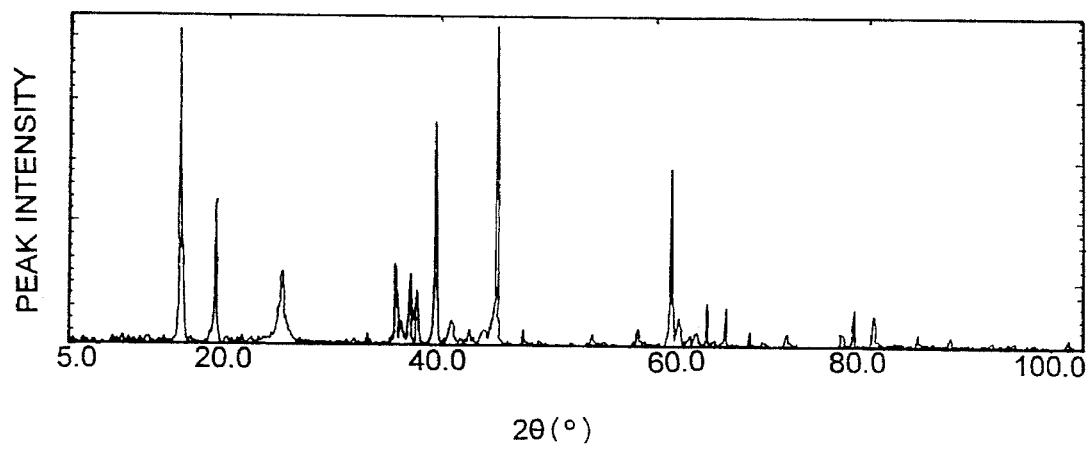
FIG. 4 is a graphic representation showing an X-ray diffraction pattern of a positive-electrode active material $LiMnO_{1.9}$ prepared in accordance with EXAMPLE 3 of the present invention.

The pellet was calcinated in a nitrogen atmosphere at a temperature of 450° C. for 72 hours to obtain a positive-electrode active material $LiMnO_{1.9}$. The powder X-ray diffraction analysis was carried out on this active material by using CuKα-ray as an X-ray source. The X-ray diffraction pattern in the range of diffraction angle 2θ between 5° and 100° was as shown in FIG. 4. Peaks between 10° and 50° were observed at 15.4°, 18.6°, 24.9°, 35.6°, 36.1°, 36.9°, 37.6°, 39.3°, 40.9°, 42.4°, 43.7°, 45.1°, and 47.4°, and the ratios $(I/I_0)$ of peak intensities observed at these peak positions to a peak intensity observed at 15.4° were 1.0, 0.44, 0.24, 0.23, 0.08, 0.22, 0.18, 0.63, 0.07, 0.05, 0.04, 0.99 and 0.06, respectively.

Preparation of positive electrode

A pellet-form positive electrode having a diameter of 20 mm and a weight of 0.25 g was prepared in substantially the same manner as in EXAMPLE 1, except that the positive-electrode active material thus obtained, acetylene black and polytetrafluoroethylene were mixed in a ratio of 100:10:8.

Evaluation of positive electrode

The performance of the positive electrode was evaluated in substantially the same manner as in EXAMPLE 1, except that an electrolytic solution was used in which lithium hexafluorophosphate was dissolved in a concentration of 1 mol/l in a solvent mixture containing propylene carbonate and diethyl carbonate in a ratio of 2:1.

As a result, the discharge capacity and average potential observed in the second charge-discharge cycle for the $LiMnO_{1.9}$ positive electrode thus prepared were 113 mAh/g and 2.68 V, respectively.

EXAMPLE 4

Synthesis of positive-electrode active material

MnOOH and lithium oxide were mixed in a weight ratio of Li:Mn=1.3:1, and the mixture was formed into a pellet in the same manner as in EXAMPLE 1. The pellet was calcinated in a nitrogen atmosphere at a temperature of 400° C. for 96 hours to obtain a positive-electrode active material $Li_{1.2}MnO_{2.2}$. The powder X-ray diffraction analysis was carried out on this active material by using CuKα-ray as an X-ray source. As a result, the X-ray diffraction pattern in the range of diffraction angle 2θ between 10° and 50° had peaks at 15.6°, 18.8°, 25.1°, 35.7°, 36.2°, 36.9°, 37.8°, 39.5°, 40.9°, 42.4°, 43.8°, 45.1°, and 47.5°, and the ratios $(I/I_0)$ of peak intensities observed at these peak positions to a peak intensity observed at 15.6° were 1.0, 0.34, 0.24, 0.22, 0.04, 0.17, 0.15, 0.58, 0.04, 0.02, 0.03, 0.77 and 0.04, respectively.

Preparation of positive electrode

A positive electrode was prepared by a generally known process. (In this process, in general, the powdered active material is dispersed in a binder solution or in a suspension in which a binder is dispersed, and kneaded for preparing a paste. In turn, the paste is applied onto a collector foil or filled into pores of a three-dimensional porous metal collector, and then thermally treated at a temperature of not lower than the boiling point of a solvent of the solution or suspension in an inert atmosphere or in the air under a reduced pressure.)

In practice, the positive-electrode active material and acetylene black were dispersed in a solution in which a binder of polyvinylidene fluoride was dissolved in a solvent of N-methyl-2-pyrrolidone to prepare a paste of the positive-electrode active material. The paste was applied on the upper surface of a collector aluminum foil, and temporarily dried in the air at a temperature of 60° C. Thereafter, the paste was dried at a temperature of 250° C. in vacuum for perfectly removing the solvent of N-methyl-2-pyrrolidone therefrom and further dried at a temperature of 200° C. under a reduced pressure for removing water therefrom. Thus, a sheet positive electrode having an apparent surface area of 4 cm² and an electrode thickness of 78 μm (a collector thickness of 20 μm) was obtained.

Evaluation of positive electrode

The performance of the positive electrode was evaluated in substantially the same manner as in EXAMPLE 1, except that an electrolytic solution was used in which lithium perchlorate was dissolved in a concentration of 1 mol/l in a solvent mixture containing propylene carbonate and dimethyl carbonate in a ratio of 1:1.

As a result, the discharge capacity and average potential observed in the second charge-discharge cycle for the $Li_{1.3}MnO_{3.2}$ positive electrode thus prepared were 118 mAh/g and 2.95 V, respectively.

EXAMPLE 5

Synthesis of positive-electrode active material

Manganese dioxide (IC No. 5) and lithium nitrate were mixed in a weight ratio of Li:Mn=1:1, and the mixture was formed into a pellet in the same manner as in EXAMPLE 1. The pellet was calcinated in a nitrogen atmosphere containing 2 vol % oxygen at a temperature of 1100° C. for four hours to obtain a positive-electrode active material $LiMnO_2$. The powder X-ray diffraction analysis was carried out on this active material by using CuKα-ray as an X-ray source. As a result, the X-ray diffraction pattern in the range of diffraction angle 2θ between 10° and 50° had peaks at 15.3°, 18.7°, 24.6°, 35.6°, 36.8°, 37.5°, 39.2°, 40.7°, 42.4°, 45.0° and 47.30°, and the ratios $(I/I_0)$ of peak intensities observed at these peak positions to a peak intensity observed at 15.3° were 1.0, 0.02, 0.58, 0.18, 0.18, 0.09, 0.53, 0.21, 0.08, 0.75 and 0.03, respectively.

Preparation of positive electrode

A positive electrode was prepared in substantially the same manner as in EXAMPLE 4 by using the positive-electrode active material thus obtained, except that N-methyl-2-pyrrolidone was removed at a temperature of 230° C. through vacuum drying. The positive electrode thus prepared had an apparent surface area of 4 cm² and an electrode thickness of 83 μm (a collector thickness of 20 μm).

Evaluation of positive electrode

The performance of the positive electrode was evaluated in the same manner as in EXAMPLE 4.

As a result, the discharge capacity and average potential observed in the second charge-discharge cycle for the $LiMnO_2$ positive electrode thus prepared were 131 mAh/g and 2.78 V, respectively.

EXAMPLE 6

Synthesis of positive-electrode active material

Dimanganese trioxide ($Mn_2O_3$) and lithium nitrate were mixed in a weight ratio of Li:Mn=0.9:1, and the mixture was formed into a pellet in the same manner as in EXAMPLE 1. The pellet was calcinated in a nitrogen atmosphere containing 10 vol % oxygen at a temperature of 600° C. for 18 hours to obtain a positive-electrode active material $Li_{0.8}MnO_{1.9}$. The powder X-ray diffraction analysis was carried out on this active material by using CuKα-ray as an X-ray source. As a result, the X-ray diffraction pattern in the range of diffraction angle 2θ between 10° and 50° had peaks at 15.5°, 18.7°, 24.8°, 35.6°, 36.3°, 36.8°, 37.6°, 39.3°, 40.8°, 42.6°, 44.0°, 45.2°, and 48.2°, and the ratios ($I/I_0$) of peak intensities observed at these peak positions to a peak intensity observed at 15.5° were 1.0, 1.5, 0.59, 0.18, 0.32, 0.08, 0.11, 0.57, 0.28, 0.10, 0.37, 0.58 and 0.10, respectively Preparation of positive electrode A positive electrode was prepared in substantially the same manner as in EXAMPLE 4 by using the positive-electrode active material thus obtained, except that N-methyl-2-pyrrolidone was removed at a temperature of 200° C. through vacuum drying. The positive electrode thus prepared had an apparent surface area of 4 cm² and an electrode thickness of 76 μm (a collector thickness of 20 μm).

Evaluation of positive electrode

The performance of the positive electrode was evaluated in the same manner as in EXAMPLE 4.

As a result, the discharge capacity and average potential observed in the second charge-discharge cycle for the $Li_{0.9}MnO_{1.9}$ positive electrode thus prepared were 98 mAh/g and 3.26 V, respectively.

EXAMPLE 7

Synthesis of positive-electrode active material

Manganese dioxide (IC No. 5) and lithium oxide were mixed in a weight ratio of Li:Mn=1.2:1, and the mixture was formed into a pellet in the same manner as in EXAMPLE 1. The pellet was calcinated in a nitrogen atmosphere containing 50 vol % propane (supplied from gas cylinders) at a temperature of 300° C. for 24 hours to obtain a positive-electrode active material $Li_{1.1}MnO_2$. The powder X-ray diffraction analysis was carried out on this active material by using CuKα-ray as an X-ray source. As a result, the X-ray diffraction pattern in the range of diffraction angle 2θ between 10° and 50° had peaks at 15.5°, 18.8°, 24.9°, 35.7°, 36.2°, 36.9°, 37.7°, 39.5°, 40.8°, 42.5°, 43.8°, 45.1° and 47.5°, and the ratios ($I/I_0$) of peak intensities observed at these peak positions to a peak intensity observed at 15.5° were 1.0, 0.88, 0.64, 0.18, 0.22, 0.14, 0.11, 0.54, 0.21, 0.10, 0.13, 0.57 and 0.04, respectively.

Preparation of positive electrode

A positive electrode was prepared in substantially the same manner as in EXAMPLE 4 by using the positive-electrode active material thus obtained. The positive electrode thus prepared had an apparent surface area of 4 cm² and an electrode thickness of 85 μm (a collector thickness of 20 μm).

Evaluation of positive electrode

The performance of the positive electrode was evaluated in substantially the same manner as in EXAMPLE 1, except that an electrolytic solution was used in which lithium perchlorate was dissolved in a concentration of 1 mol/l in a solvent mixture containing ethylene carbonate and dimethyl carbonate in a ratio of 1:1.

As a result, the discharge capacity and average potential observed in the second charge-discharge cycle for the $Li_{1.1}MnO_2$ positive electrode thus prepared were 123 mAh/g and 2.93 V, respectively.

EXAMPLE 8

Synthesis of positive-electrode active material

MnOOH and lithium oxide were mixed in a weight ratio of Li:Mn=1.1:1, and the mixture was formed into a pellet in the same manner as in EXAMPLE 1. The pellet was calcinated in a nitrogen atmosphere containing 5 vol % propane (supplied from gas cylinders) at a temperature of 600° C. for eight hours to obtain a positive-electrode active material $LiMnO_2$. The powder X-ray diffraction analysis was carried out on this active material by using CuKα-ray as an X-ray source. As a result, the X-ray diffraction pattern in the range of diffraction angle 2θ between 10° and 50° had peaks at 15.5°, 18.7°, 24.9°, 35.7°, 36.2°, 36.9°, 37.6°, 39 4°, 40.7°, 42.5°, 43.9°, 45.0° and 47.4°, and the ratios ($I/I_0$) of peak intensities observed at these peak positions to a peak intensity observed at 15.5° were 1.0, 0.51, 0.58, 0.18, 0.08, 0.10, 0.10, 0.63, 0.23, 0.12, 0.05, 0.57 and 0.03, respectively.

Preparation of positive electrode

A positive electrode was prepared in substantially the same manner as in EXAMPLE 4 by using the positive-electrode active material thus obtained. The positive electrode thus prepared had an apparent surface area of 4 cm² and an electrode thickness of 73 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_2$ positive electrode thus prepared were 125 mAh/g and 2.83 V, respectively.

EXAMPLE 9

Synthesis of positive-electrode active material

A positive-electrode active material $LiMnO_2$ was prepared in substantially the same manner as in EXAMPLE 8, except that the pellet was calcinated in a nitrogen atmosphere containing 30 vol % propane at a temperature of 400° C. for ten hours. The powder X-ray diffraction analysis was carried out on this active material by using CuKα-ray as an X-ray source. As a result, the X-ray diffraction pattern in the range of diffraction angle 2θ between 10° and 50° had peaks at 15.5°, 18.8°, 24.7°, 35.6°, 36.3°, 36.9°, 37.5°, 39.4°, 40.8°, 42.5°, 44.0°, 45.0° and 47.4°, and the ratios ($I/I_0$) of peak intensities observed at these peak positions to a peak intensity observed at 15.5° were 1.0, 0.65, 0.66, 0.16, 0.15, 0.12, 0.08, 0.49, 0.24, 0.14, 0.11, 0.61 and 0.04, respectively.

Preparation of positive electrode

A positive electrode was prepared in substantially the same manner as in EXAMPLE 4 by using the positive-electrode active material thus obtained. The positive electrode thus prepared had an apparent surface area of 4 cm² and an electrode thickness of 81 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_2$ positive electrode thus prepared were 115 mAh/g and 2.90 V, respectively.

EXAMPLE 10

Synthesis of positive-electrode active material

Electrolytic manganese dioxide (IC No. 1) and lithium oxide were mixed in a weight ratio of Li:Mn=1.1:1, and the mixture was formed into a pellet in the same manner as in EXAMPLE 1. The pellet was calcinated in an argon atmosphere containing 0.01 vol % propane (supplied from gas cylinders) at a temperature of 1100° C. for five hours to obtain a positive-electrode active material $LiMnO_2$. The powder X-ray diffraction analysis was carried out on this active material by using CuKα-ray as an X-ray source. As a result, the X-ray diffraction pattern in the range of diffraction angle 2θ between 10° and 50° had peaks at 15.3°, 18.7°, 24.6°, 35.5°, 36.3°, 36.9°, 37.5°, 39.3°, 40.7°, 42.5°, 44.0°, 45.1° and 47.4°, and the ratios ($I/I_0$) of peak intensities observed at these peak positions to a peak intensity observed at 15.3° were 1.0, 0.33, 0.62, 0.18, 0.10, 0.13, 0.08, 0.58, 0.25, 0.12, 0.09, 0.66 and 0.04, respectively.

Preparation of positive electrode

A positive electrode was prepared in substantially the same manner as in EXAMPLE 4 by using the positive-electrode active material thus obtained. The positive electrode thus prepared had an apparent surface area of 4 cm$^2$ and an electrode thickness of 75 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_2$ positive electrode thus prepared were 129 mAh/g and 2.85 V, respectively.

EXAMPLE 11

Synthesis of positive-electrode active material

A positive-electrode active material $LiMnO_2$ was prepared in substantially the same manner as in EXAMPLE 10, except that the pellet was calcinated in a nitrogen atmosphere containing 30 vol % hydrogen at a temperature of 250° C. for five hours. The powder X-ray diffraction analysis was carried out on this active material by using CuKα-ray as an X-ray source. As a result, the X-ray diffraction pattern in the range of diffraction angle 2θ between 10° and 50° had peaks at 15.4°, 18.8°, 24.7°, 35.6°, 36.3°, 36.9°, 37.6°, 39.4°, 40.7°, 42.8°, 44.1°, 45.1° and 47.3°, and the ratios ($I/I_0$) of peak intensities observed at these peak positions to a peak intensity observed at 15.4° were 1.0, 0.35, 0.59, 0.17, 0.09, 0.17, 0.08, 0.51, 0.22, 0.15, 0.08, 0.58 and 0.03, respectively.

Preparation of positive electrode

A positive electrode was prepared in substantially the same manner as in EXAMPLE 4 by using the positive-electrode active material thus obtained. The positive electrode thus prepared had an apparent surface area of 4 cm$^2$ and an electrode thickness of 70 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_2$ positive electrode thus prepared were 126 mAh/g and 2.77 V, respectively.

EXAMPLE 12

Synthesis of positive-electrode active material

A positive-electrode active material $LiMnO_2$ was prepared in substantially the same manner as in EXAMPLE 10, except that the pellet was calcinated in a nitrogen atmosphere containing 5 vol % hydrogen at a temperature of 300° C. for five hours. The powder X-ray diffraction analysis was carried out on this active material by using CuKα-ray as an X-ray source. As a result, the X-ray diffraction pattern in the range of diffraction angle 2θ between 10° and 50° had peaks at 15.5°, 18.8°, 24.8°, 35.6°, 36.4°, 37.0°, 37.6°, 39.4°, 40.8°, 42.6°, 44.1°, 45.1° and 47.4°, and the ratios ($I/I_0$) of peak intensities observed at these peak positions to a peak intensity observed at 15.5° were 1.0, 0.24, 0.48, 0.17, 0.04, 0.11, 0.07, 0.61, 0.28, 0.14, 0.03, 0.57 and 0.02, respectively.

Preparation of positive electrode

A positive electrode was prepared in substantially the same manner as in EXAMPLE 4 by using the positive-electrode active material thus obtained. The positive electrode thus prepared had an apparent surface area of 4 cm$^2$ and an electrode thickness of 88 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_2$ positive electrode thus prepared were 117 mAh/g and 2.75 V, respectively.

EXAMPLE 13

Synthesis of positive-electrode active material

A positive-electrode active material $LiMnO_2$ was prepared in substantially the same manner as in EXAMPLE 10, except that the pellet was calcinated in a nitrogen atmosphere containing 0.1 vol % hydrogen at a temperature of 400° C. for five hours. The powder X-ray diffraction analysis was carried out on this active material by using CuKα-ray as an X-ray source. As a result, the X-ray diffraction pattern in the range of diffraction angle 2θ between 10° and 50° had peaks at 15.4°, 18.7°, 24.7°, 35.5°, 36.9°, 37.5°, 39.3°, 40.7°, 42.5°, 45.1° and 47.3°, and the ratios ($I/I_0$) of peak intensities observed at these peak positions to a peak intensity observed at 15.4° were 1.0, 0.09, 0.62, 0.19, 0.10, 0.08, 0.51, 0.26, 0.15, 0.66, and 0.03, respectively.

Preparation of positive electrode

A positive electrode was prepared in substantially the same manner as in EXAMPLE 4 by using the positive-electrode active material thus obtained. The positive electrode thus prepared had an apparent surface area of 4 cm$^2$ and an electrode thickness of 82 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_2$ positive electrode thus prepared were 130 mAh/g and 2.81 V, respectively.

EXAMPLE 14

Synthesis of positive-electrode active material

A positive-electrode active material $LiMnO_2$ was prepared in substantially the same manner as EXAMPLE in 10, except that the pellet was calcinated at a temperature of 800° C. for five hours under such a condition that argon gas containing benzene vapor generated by bubbling argon gas through benzene kept at-a constant temperature of 25° C.

was supplied to a calcination vessel. The powder X-ray diffraction analysis was carried out on this active material by using CuKα-ray as an X-ray source. As a result, the X-ray diffraction pattern in the range of diffraction angle 2θ between 10° and 50° had peaks at 15.4°, 18.8°, 24.7°, 35.6°, 36.9°, 37.5°, 39.3°, 40.7°, 42.5°, 45.0° and 47.3°, and the ratios ($I/I_0$) of peak intensities observed at these peak positions to a peak intensity observed at 15.4° were 1.0, 0.15, 0.61, 0.15, 0.13, 0.09, 0.58, 0.28, 0.10, 0.55, and 0.04, respectively.

Preparation of positive electrode

A positive electrode was prepared in substantially the same manner as in EXAMPLE 4 by using the positive-electrode active material thus obtained. The positive electrode thus prepared had an apparent surface area of 4 cm$^2$ and an electrode thickness of 81 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the LiMnO$_2$ positive electrode thus prepared were 122 mAh/g and 2.93 V, respectively.

EXAMPLE 15

Synthesis of positive-electrode active material

A positive-electrode active material LiMnO$_2$ was prepared in substantially the same manner as in EXAMPLE 10, except that the pellet was calcinated under such a condition that argon gas containing 1-pentanol vapor generated by bubbling argon gas through 1-pentanol kept at a constant temperature of 50° C. was supplied to a calcination vessel. The powder X-ray diffraction analysis was carried out on this active material by using CuKα-ray as an X-ray source. As a result, the X-ray diffraction pattern in the range of diffraction angle 2θ between 10° and 50° had peaks at 15.5°, 18.7°, 24.7°, 35.6°, 36.3°, 36.9°, 37.5°, 39.3°, 40.8°, 42.6°, 44.1°, 45.1° and 47.4°, and the ratios ($I/I_0$) of peak intensities observed at these peak positions to a peak intensity observed at 15.5° were 1.0, 0.21, 0.56, 0.17, 0.08, 0.14, 0.04, 0.51, 0.26, 0.11, 0.09, 0.71 and 0.05, respectively.

Preparation of positive electrode

A positive electrode was prepared in substantially the same manner as in EXAMPLE 4 by using the positive-electrode active material thus obtained. The positive electrode thus prepared had an apparent surface area of 4 cm$^2$ and an electrode thickness of 77 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the LiMnO$_2$ positive electrode thus prepared were 116 mAh/g and 2.85 V, respectively.

EXAMPLE 16

Synthesis of positive-electrode active material

A positive-electrode active material LiMnO$_2$ was prepared in substantially the same manner as in EXAMPLE 10, except that the pellet was calcinated under such a condition that argon gas containing ethyl butyrate vapor generated by bubbling argon gas through ethyl butyrate kept at a constant temperature of 25° C. was supplied to a calcination vessel. The powder X-ray diffraction analysis was carried out on this active material by using CuKα-ray as an X-ray source. As a result, the X-ray diffraction pattern in the range of diffraction angle 2θ between 10° and 50° had peaks at 15.5°, 18.7°, 24.9°, 35.6°, 36.3°, 36.9°, 37.6°, 39.3°, 40.8°, 42.6°, 44.1°, 45.1° and 47.4°, and the ratios ($I/I_0$) of peak intensities observed at these peak positions to a peak intensity observed at 15.5° were 1.0, 0.19, 0.52, 0.16, 0.06, 0.13, 0.05, 0.53, 0.25, 0.12, 0.07, 0.62 and 0.03, respectively.

Preparation of positive electrode

A positive electrode was prepared in substantially the same manner as in EXAMPLE 4 by using the positive-electrode active material thus obtained. The positive electrode thus prepared had an apparent surface area of 4 cm$^2$ and an electrode thickness of 79 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the LiMnO$_2$ positive electrode thus prepared were 111 mAh/g and 2.89 V, respectively.

EXAMPLES 17 TO 19

Synthesis of positive-electrode active materials

Electrolytic manganese dioxide (IC No. 1), lithium oxide and naphthalene were mixed in ratios of Li:Mn=1.1:1 and Mn:C=1:3, 1:5 and 1:10, and the mixtures were respectively formed into pellets in the same manner as in EXAMPLE 1. The respective pellets were filled in calcination tubes having a diameter of 3 cm and a length of 1 m, and calcinated in a nitrogen atmosphere at a temperature of 700° C. for five hours to obtain positive-electrode active materials LiMnO$_2$. The powder X-ray diffraction analysis was carried out on these active materials by using CuKα-ray as an X-ray source. As a result, the respective X-Fay diffraction patterns in the range of diffraction angle 2θ between 10° and 50° had peaks around 15.4°, 18.8°, 24.7°, 35.6°, 36.2°, 36.9°, 37.5°, 39.3°, 40.7°, 42.5°, 44.0°, 45.0° and 47.3°, and the ratios ($I/I_0$) of peak intensities observed around 18.8° to peak intensities observed around 15.4° were 0.85, 0.65 and 0.59 for these three active materials.

Preparation of positive electrodes

Positive electrodes were prepared in substantially the same manner as in EXAMPLE 4 by using the positive-electrode active materials thus obtained. The positive electrodes thus prepared had an apparent surface area of 4 cm$^2$ and electrode thicknesses of 85 μm, 73 μm and 82 μm (a collector thickness of 20 μm).

Evaluation of positive electrode

The performances of the positive electrodes were evaluated in the same manner as in EXAMPLE 7.

As a result, the discharge capacities observed in the second charge-discharge cycle for the LiMnO$_2$ positive electrodes thus prepared were 112 mAh/g, 119 mAh/g and 116 mAh/g, and the average potentials were 2.95 V, 2.88 V and 2.79 V.

EXAMPLES 20 TO 22

Synthesis of positive-electrode active materials

Pellets were prepared in substantially the same manner as in EXAMPLEs 17 to 19 by using electrolytic manganese dioxide (IC No. 1), lithium oxide and naphthalene. The respective pellets were filled in calcination tubes having a diameter of 10cm and a length of 1 m, and calcinated in a nitrogen atmosphere at a temperature of 700° C. for five hours to obtain positive-electrode active materials $LiMnO_2$. The powder X-ray diffraction analysis was carried out on these active materials by using CuKα-ray as an X-ray source. As a result, the respective X-ray diffraction patterns in the range of diffraction angle 2θ between 10° and 50° had peaks around 15.4°, 18.8°, 24.7°, 35.6°, 36.2°, 36.9°, 37.5°, 39.3°, 40.7°, 42.5°, 44.0°, 45.0° and 47.3°, and the ratios ($I/I_0$) of peak intensities observed around 18.8° to peak intensities observed around 15.4° were 1.1, 0.84 and 0.82 for these three active materials.

Preparation of positive electrode

Positive electrodes were prepared in substantially the same manner as in EXAMPLE 4 by using the positive-electrode active materials thus obtained. The positive electrodes thus prepared had an apparent surface area of 4 $cm^2$ and electrode thicknesses of 85 μm, 73 μm and 82 μm (a collector thickness of 20 m).

Evaluation of positive electrode

The performances of the positive electrodes were evaluated in the same manner as in EXAMPLE 7.

As a result, the discharge capacities observed in the second charge-discharge cycle for the $LiMnO_2$ positive electrodes thus prepared were 101 mAh/g, 113 mAh/g and 109 mAh/g, and the average potentials were 3.15 V, 3.01 V and 2.95 V.

EXAMPLE 23

Synthesis of positive-electrode active material and preparation of positive electrode A positive-electrode active material was synthesized, and a positive electrode in a pellet form having a diameter of 15 mm and a weight of 50 mg was prepared in substantially the same manner as in EXAMPLE 2.

Preparation of negative electrode

A carbon material obtained through pyrolysis was employed as a negative-electrode active material. A starting material of propane was decomposed at a temperature of about 750° C. for about two hours under a normal pressure through gas phase pyrolysis, and decomposed carbon was deposited on a substrate of a nickel foil (4 $cm^2$). The ordinary X-ray diffraction analysis on the carbon material thus obtained showed that the interfacial distance ($d_{002}$) of (002) plane of the carbon material was 0.337 nm and the crystalline unit cell thickness Lc in a direction of (002) plane was 15 nm. The argon laser Raman spectrum analysis on the carbon material showed that the ratio of a peak intensity observed around 1360 $cm^{-1}$ to that observed around 1580 $cm^{-1}$ was 0.46 (on R-value basis).

A terminal was established by spot-welding a nickel wire onto the nickel foil on which the pyrolyzed carbon was deposited. Then, the composite of the nickel foil and carbon material was dried at a temperature of 200° C. under a reduced pressure for removing moisture therefrom. Thus, a negative electrode containing 16mg of a negative-electrode active material was completed.

Evaluation of battery

A battery was fabricated by using a beaker type cell, the positive and negative electrodes thus prepared and an electrolytic solution in which lithium perchlorate was dissolved in a concentration of 1 mol/l in a solvent mixture containing propylene carbonate and diethyl carbonate in a ratio of 1:1. The battery thus fabricated was evaluated in the following manner.

In a charge-discharge test, the battery was charmed at a constant current of 0.2 mA up to 4.1 V, and then discharged at the same current to 1.0 V in the first charge-discharge cycle. This charge-discharge process was thereafter repeated within the same potential range for the evaluation of the battery.

As a result, the discharge capacity and average potential observed in the second charge-discharge cycle for the battery thus fabricated were 4 mAh and 2.4 V, respectively.

EXAMPLE 24

Synthesis of positive-electrode active material and preparation of positive electrode A positive-electrode active material was synthesized, and a positive electrode in a pellet form having a diameter of 20 mm and a weight of 0.25 g was prepared in substantially the same manner as in EXAMPLE 2.

Preparation of negative electrode

A nonionic dispersing agent and dispersion solution of polytetrafluoroethylene (a weight ratio of polytetrafluoroethylene to copper oxide-graphite composite material after drying was 87:13) were added to natural graphite (flaky particles size: 11 μm, $d_{002}$: 0.337 nm, Lc: 27 nm, La: 17 nm, R value: 0, specific surface area: 8 $m^2/g$) from Madagascar, and the mixture was kneaded into a paste form. The paste was applied on the both surfaces of a collector made of a copper foil, and dried at a temperature of 60° C. Thereafter, the composite of the copper foil and graphite was thermally treated at a temperature of 240° C., and then compressed. Further, the composite was dried at a temperature of 200° C. under a reduced pressure for removing moisture therefrom. Thus, a negative electrode which comprised a negative-electrode active material having a surface area of 8 $cm^2$ and a weight of 78 mg was completed.

Evaluation of battery

A battery was fabricated by using a beaker type cell, the positive and negative electrodes thus prepared and an electrolytic solution in which lithium perchlorate was dissolved in a concentration of 1 mol/l in a solvent mixture containing propylene carbonate and diethyl carbonate in a ratio of 1:1. The battery thus fabricated was evaluated in the following manner.

In a charge-discharge test, the battery was charged at a constant current of 2 mA up to 4.1 V, and then discharged at the same current to 2.0 V in the first charge-discharge cycle. This charge-discharge process was thereafter repeated within the same potential range for the evaluation of the battery.

As a result, the discharge capacity and average potential observed in the second charge-discharge cycle for the battery thus fabricated were 21 mAh and 2.5 V, respectively.

EXAMPLE 25

Synthesis of positive-electrode active material and preparation of positive electrode A positive-electrode active material was synthesized in the same manner as in EXAMPLE 5, and a positive electrode in a pellet form having a diameter of 15 mm and a thickness of 0.77 mm was prepared in substantially the same manner as in EXAMPLE 1.

Preparation of negative electrode

Figure 5:
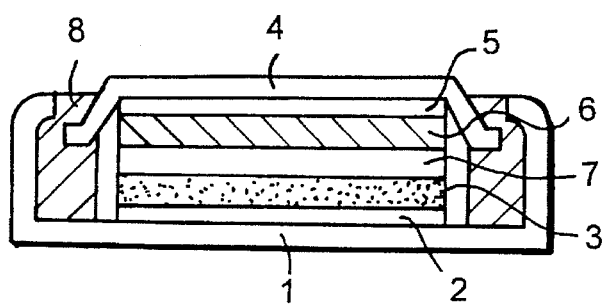
FIG. 5 is a schematic sectional view of a nonaqueous secondary battery according to the present invention.

A negative-electrode active material prepared in the same manner as in EXAMPLE 8 (natural graphite from Madagascar) was blended with polytetrafluoroethylene in a weight ratio of 10:1, and formed into a pellet having a diameter of 14 mm and a thickness of 0.57 mm through pressure molding. At this time, a nickel mesh serving as a collector was integrated with the pellet in this pressure molding. The pellet was dried at a temperature of 200° C. under a reduced pressure for removing moisture therefrom. Thus, a negative electrode was completed. Assembly of battery A battery was assembled which comprised as a principal component a positive electrode case 1, positive electrode 3, negative electrode case 4 and negative electrode 8, as shown in FIG. 5. First, a positive electrode collector 2 was attached onto the inner bottom face of the positive electrode case 1 by way of welding, and an insulation packing 8 was disposed along the inner periphery of the positive electrode case 1. Then, the positive electrode 3 was pressedly attached onto the positive electrode collector 2. In turn, a separator 7 made of polypropylene nonwoven fabric was placed on the positive electrode 3, and impregnated with an electrolytic solution in which an electrolyte $LiPF_6$ was dissolved in a concentration of 1 mol/l in a solvent mixture containing ethylene carbonate, propylene carbonate and diethyl carbonate in a volume ratio of 2:1:3. A negative electrode collector 5 was attached onto the inner face of the negative electrode case 4, and the negative electrode 8 was pressedly attached onto the negative electrode collector 5. In turn, the negative electrode 6 was placed on the separator 7, and the positive electrode case 1 was pressedly secured to the negative electrode 4 via the insulation packing 8 for sealing. Thus, coin type batteries were fabricated. The capacity of each battery was specified by the negative electrode thereof.

Evaluation of battery

A charge-discharge test was carried out on the plurality of coin type batteries thus fabricated. The batteries were charged at a charging current of 1 mA up to an upper charging voltage limit of 4.2 V. Thereafter, the batteries were discharged to a lower voltage limit of 2.0 V, and charged at a constant voltage of 4.2 V for 30 hours. For the evaluation of the batteries, this charge-discharge process was repeated for measuring the discharge capacity thereof.

As a result, the average discharge voltage was 2.7 V, and the discharge capacity observed in the second charge-discharge cycle and the average discharge capacity observed in the 20th cycle were 20 mAh and 17 mAh, respectively.

COMPARATIVE EXAMPLE 1

Synthesis of positive-electrode active material

Figure 6:
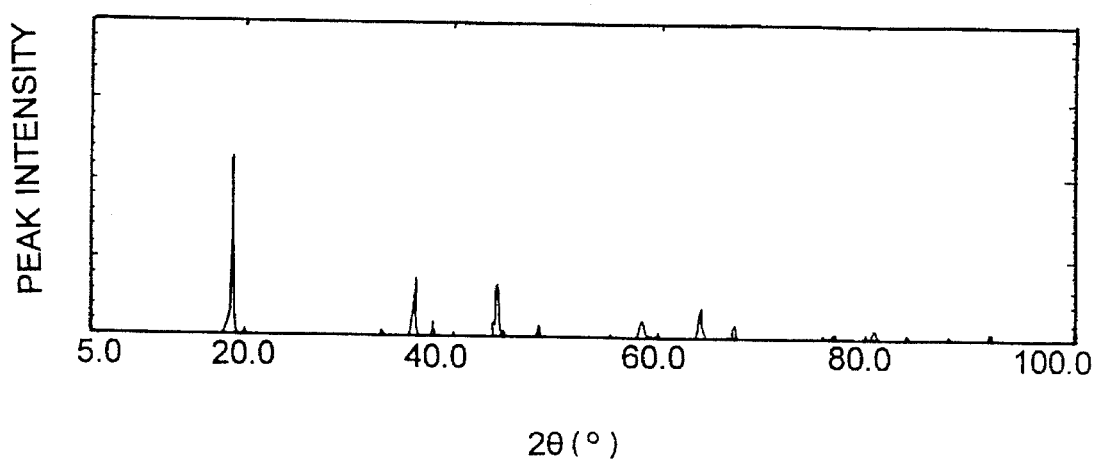
FIG. 6 is a graphic representation showing an X-ray diffraction pattern of a positive-electrode active material $LiMn_2O_{3.9}$ prepared in accordance with COMPARATIVE EXAMPLE 1.

Electrolytic manganese dioxide (IC No. 1) and lithium hydroxide were mixed in a weight ratio of Li:Mn=1:1, and the mixture was formed into a pellet in the same manner as in EXAMPLE 1. The pellet was calcinated in the air at a temperature of 700° C. for five hours to obtain a positive-electrode active material $LiMn_2O_{3.9}$ ($Li_{0.5}MnO_{1.95}$). The powder X-ray diffraction analysis was carried out on this active material by using CuKα-ray as an X-ray source. The X-ray diffraction pattern was as shown in FIG. 6, from which this positive-electrode active material was identified as $LiMn_2O_4$.

Preparation of positive electrode

A pellet-form positive electrode having a diameter of 20 mm and a weight of 0.25 g was prepared in substantially the same manner as in EXAMPLE 1, except that the positive-electrode active material thus obtained, acethylene black polytetrafluoroethylene were mixed in a weight ratio of 100:15:5.

Evaluation of positive electrode

The performance of the positive electrode was evaluated in the same manner as EXAMPLE 1.

As a result, the discharge capacity and average potential observed in the second charge-discharge cycle for the $LiMn_2O_4$ positive electrode thus prepared were 85 mAh/g and 3.87 V, respectively.

COMPARATIVE EXAMPLE 2

Synthesis of positive-electrode active material

Figure 7:
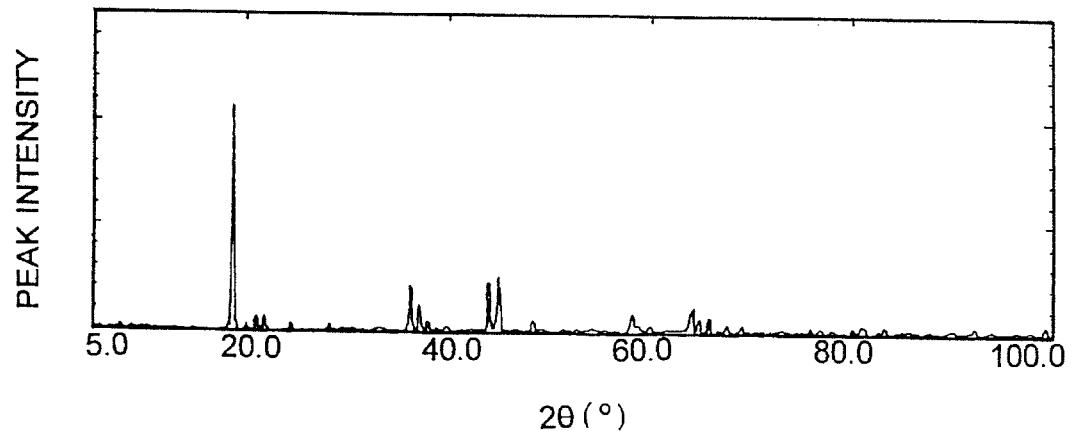
FIG. 7 is a graphic representation showing an X-ray diffraction pattern of a positive-electrode active material $Li_{1.9}Mn_2O_{4.6}$ prepared in accordance with COMPARATIVE EXAMPLE 2.

Electrolytic manganese dioxide (IC No. 1) and lithium hydroxide were mixed in a weight ratio of Li:Mn=1:1, and the mixture was formed into a pellet in the same manner as in EXAMPLE 1. The pellet was calcinated in the air at a temperature of 700° C. for three hours to obtain a positive-electrode active material $Li_{1.9}Mn_2O_{4.5}$ ($Li_{0.95}MnO_{2.25}$). The powder X-ray diffraction analysis was carried out on this active material by using CuKα-ray as an X-ray source. The X-ray diffraction pattern was as shown in FIG. 7, from which it is found that this positive-electrode active material was a mixture of $LiMn_2O_4$ and $Li_2MnO_3$, and that a peak was not observed around 15.5.

Preparation of positive electrode

A pellet-form positive electrode having a diameter of 20 mm and a weight of 0.25 g was prepared in substantially the same manner as in COMPARATIVE EXAMPLE 1.

Evaluation of positive electrode

The performance of the positive electrode was evaluated in the same manner as in EXAMPLE 1.

As a result, the discharge capacity and average potential observed in the second charge-discharge cycle for the positive electrode thus prepared were 51 mAh/g and 3.79 V, respectively.

COMPARATIVE EXAMPLE 3

Synthesis of positive-electrode active material

Figure 8:
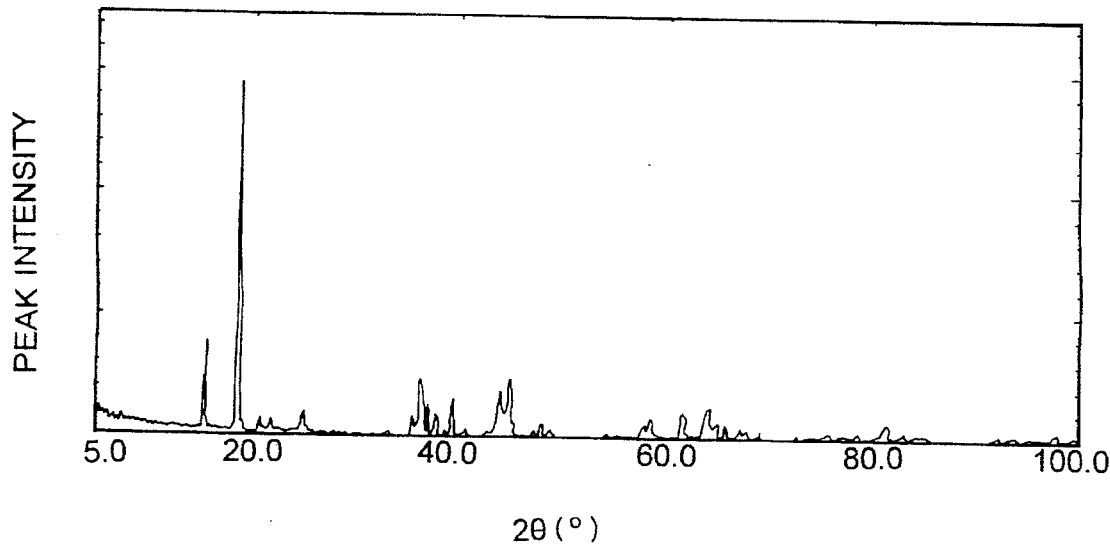
FIG. 8 is a graphic representation showing an X-ray diffraction pattern of a positive-electrode active material $Li_{1.2}MnO_{2.3}$ prepared in accordance with COMPARATIVE EXAMPLE 3.

Electrolytic manganese dioxide (IC No. 1) and lithium hydroxide were mixed in a weight ratio of Li:Mn=1.5:1, and the mixture was formed into a pellet in the same manner as in EXAMPLE 1. The pellet was calcinated in the air at a temperature of 800° C. for three hours to obtain a positive-electrode active material $Li_{1.3}MnO_{2.3}$. The powder X-ray diffraction analysis was carried out on this active material by using CuKα-ray as an X-ray source. The X-ray diffraction pattern was as shown in FIG. 8, from which it is found that this positive-electrode active material was a mixture of $LiMn_2O$ and $Li_2MnO_3$, and that the ratio of a peak intensity observed around 18.8° to that observed around 15.5° was 3.8.

Preparation of positive electrode

A pellet-form positive electrode having a diameter of 20 mm and a weight of 0.25 g was prepared in substantially the same manner as in EXAMPLE 1, except that the positive-electrode active material thus obtained, acetylene black and polytetrafluoroethylene were mixed in a ratio of 100:15:5.

Evaluation of positive electrode

The performance of the positive electrode was evaluated in the same manner as in EXAMPLE 1.

As a result, the discharge capacity and average potential observed in the second charge-discharge cycle for the positive electrode thus prepared were 89 mAh/g and 2.71 V, respectively.

COMPARATIVE EXAMPLE 4

Synthesis of positive-electrode active material Electrolytic manganese dioxide (IC No. 1) and lithium hydroxide were mixed in a weight ratio of Li:Mn=1.1:1, and the mixture was formed into a pellet in the same manner as in EXAMPLE 1. The pellet was calcinated in a nitrogen atmosphere containing 15 vol % oxygen at a temperature of 700° C. for five hours to obtain a positive-electrode active material $Li_{0.9}MnO_{2.1}$. The powder X-ray diffraction analysis was carried out on this active material by using CuKα-ray as an X-ray source. The X-ray diffraction pattern in the range of diffraction angle 2θ between 10° and 50° had peaks at 15.3°, 18.8°, 21.0°, 21.9°, 24.7°, 28.3°, 33.0°, 35.6°, 36.3°, 37.0°, 37.5°, 38.0°, 38.7°, 39.3°, 40.8°, 42.4°, 42.9°, 43.9°, 45.1°, 46.9°, 47.4°, 48.2° and 49.1°, and the ratios ($I/I_0$) of peak intensities observed at these peak positions to a peak intensity observed at 15.3° were 1.0, 0.7., 0.05, 0.08, 0.7.0, 0.05, 0.20, 0.20, 0.19, 0.21, 0.10, 0.06, 0.03, 0.60, 0.80, 0.16, 0.02, 0.17, 0.75, 0.03, 0.05, 0.04, and 0.03, respectively. This positive-electrode material presented peaks in the range of diffraction angle 2θ between 27° and 33°.

Preparation of positive electrode

A positive electrode was prepared in substantially the same manner as in EXAMPLE 4 by using the positive-electrode active material thus obtained. The positive electrode thus prepared had an apparent surface area of 4 cm² and an electrode thickness of 33 μm (a collector thickness of 20 μm).

Evaluation of positive electrode

The performance of the positive electrode was evaluated in the same manner as in EXAMPLE 4.

As a result, the discharge capacity and average potential observed in the second charge-discharge cycle for the $Li_{0.9}MnO_{2.1}$ positive electrode thus prepared were 73 mAh/g and 2.81 V, respectively.

COMPARATIVE EXAMPLE 5

Synthesis of positive-electrode active material

Electrolytic manganese dioxide (IC No. 1) and lithium hydroxide were mixed in a weight ratio of Li:Mn=1.1:1, and the mixture was formed into a pellet in the same manner as in EXAMPLE 1. The pellet was calcinated in a nitrogen atmosphere containing 20 vol % oxygen at a temperature of 750° C. for seven hours to obtain a positive-electrode active material $LiMnO_{2.2}$. The powder X-ray diffraction analysis was carried out on this active material by using CuKα-ray as an X-ray source. The X-ray diffraction pattern in the range of diffraction angle 2θ between 10° and 50° had peaks at 15.4°, 18.7°, 21.0°, 23.0°, 24.6°, 28.3°, 33.1°, 35.6°, 36.2°, 37.0°, 37.6°, 38.0°, 38.9°, 39.3°, 40.7°, 42.5°, 42.9°, 44.0°, 45.0°, 46.9°, 47.4°, 48.2° and 49.0°, and the ratios ($I/I_0$) of peak intensities observed at these peak positions to a peak intensity observed at 15.4° were 1.0, 1.0, 0.08, 0.13, 0.80, 0.09, 0.04, 0.20, 0.21, 0.30, 0.10, 0.10, 0.04, 0.55, 0.23, 0.20, 0.04, 0.23, 1.3, 0.04, 0.03, 0.04, and 0.08, respectively. This positive-electrode material presented peaks in the range of diffraction angle 2θ between 27° and 33°.

Preparation of positive electrode

A positive electrode was prepared in substantially the same manner as in EXAMPLE 4 by using the positive-electrode active material thus obtained. The positive electrode thus prepared has an apparent surface area of 4 cm² and an electrode thickness of 63 μm (a collector thickness of 20 μm).

Evaluation of positive electrode

The performance of the positive electrode was evaluated in the same manner as in EXAMPLE 6.

As a result, the discharge capacity and average potential observed in the second charge-discharge cycle for the $LiMnO_{2.2}$ positive electrode thus prepared were 63 mAh/g and 3.13 V, respectively.

COMPARATIVE EXAMPLE 6

Synthesis of positive-electrode active material

Electrolytic manganese dioxide (IC No. 1) and lithium hydroxide were mixed in a weight ratio of Li:Mn=1.1:1, and the mixture was formed into a pellet in the same manner as in EXAMPLE 1. The pellet was calcinated in a nitrogen atmosphere at a temperature of 350° C. for seven hours to obtain a positive-electrode active material $LiMnO_{2.3}$. The powder X-ray diffraction analysis was carried out on this active material by using CuKα-ray as an X-ray source. The X-ray diffraction pattern in the range of diffraction angle 2θ between 10° and 50° had broad peaks. It was, therefore, impossible to obtain the ratios of a peak intensity observed in the range between 18.6° and 18.8° to that observed in the range between 15.2° and 15.6°.

A positive electrode was prepared by using the positive-electrode active material thus obtained, and the performance thereof was evaluated in substantially the same manner as in EXAMPLE 4.

The positive electrode presented a low initial discharge capacity of 36 mAh/g, which was insufficient to start the charge-discharge process from the charged state.

COMPARATIVE EXAMPLE 7

Synthesis of positive-electrode active material

Electrolytic manganese dioxide (IC No. 1) and lithium hydroxide were mixed in a weight ratio of Li:Mn=1.1:1, and the mixture was formed into a pellet in the same manner as in EXAMPLE 1. The pellet was calcinated in a nitrogen atmosphere containing 60 vol % propane (supplied from gas cylinders) at a temperature of 900° C. for five hours. However, a positive-electrode active material thus obtained was contaminated with soot generated in a gas phase. This material was impossible to be used for a positive electrode.

COMPARATIVE EXAMPLE 8

Synthesis of positive-electrode active material

Electrolytic manganese dioxide (IC No. 1) and lithium hydroxide were mixed in a weight ratio of Li:Mn=1.1:1, and the mixture was formed into a pellet in the same manner as in EXAMPLE 1. The pellet was calcinated in a nitrogen atmosphere containing 55 vol % propane (supplied from gas cylinders) at a temperature of 250° C. for 20 hours to obtain a positive-electrode active material $LiMnO_{2.2}$. The powder X-ray diffraction analysis was carried out on this active material by using CuKα-ray as an X-ray source. As a result, a peak was not observed around 15.5°.

Preparation of positive electrode

A positive electrode was prepared in substantially the same manner as in EXAMPLE 4 by using the positive-electrode active material thus obtained. The positive electrode thus prepared has an apparent surface area of 4 cm² and an electrode thickness of 89 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_{2.2}$ positive electrode thus prepared were 75 mAh/g and 3.11 V, respectively.

COMPARATIVE EXAMPLE 9

Synthesis of positive-electrode active material

A positive-electrode active material $LiMnO_{1.7}$ was prepared in substantially the same manner as in EXAMPLE 10, except that the pellet was calcinated in a nitrogen atmosphere containing 40 vol % hydrogen at a temperature of 400° C. for five hours. The powder X-ray diffraction analysis was carried out on this active material by using CuKα-ray as an X-ray source. As a result, a peak was not observed around 15.5°.

Preparation of positive electrode

A positive electrode was prepared in substantially the same manner as in EXAMPLE 4 by using the positive-electrode active material thus obtained. The positive electrode thus prepared has an apparent surface area of 4 cm² and an electrode thickness of 77 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_{1.7}$ positive electrode thus prepared were 30 mAh/g and 3.24 V, respectively.

COMPARATIVE EXAMPLE 10

Synthesis of positive-electrode active material

A positive-electrode active material $LiMnO_{1.9}$ was prepared in substantially the same manner as in EXAMPLE 11, except that the pellet was calcinated in a nitrogen atmosphere containing 40 vol % hydrogen at a temperature of 200° C. for five hours. The powder X-ray diffraction analysis was carried out on this active material by using CuKα-ray as an X-ray source. As a result, a peak was not observed around 15.5°.

Preparation of positive electrode

A positive electrode was prepared in substantially the same manner as in EXAMPLE 4 by using the positive-electrode active material thus obtained. The positive electrode thus prepared has an apparent surface area of 4 cm² and an electrode thickness of 83 μm (a collector thickness of 20 μm).

Evaluation of positive electrode

The performance of the positive electrode was evaluated in the same manner as in EXAMPLE 7.

As a result, the discharge capacity and average potential observed in the second charge-discharge cycle for the $LiMnO_{1.7}$ positive electrode thus prepared were 63 mAh/g and 3.02 V, respectively.

As has been described, the nonaqueous secondary battery of the present invention has a negative electrode comprising an active material which contains lithium or enables lithium to intercalate/deintercalate or insertion/desertion and a positive electrode comprising an active material of a lithium manganese composite oxide. By utilizing such combination of the positive- and negative- electrode active materials, the material cost can be reduced, and the generation of dendrite during a repeated charge-discharge process can be prevented. Further, since the conventionally required process of discharging the positive electrode or charging the negative electrode can be eliminated, the battery production process can be more simplified.

Still further, in accordance with the process for producing a positive-electrode active material for use in the nonaqueous secondary battery of the present invention, a desired lithium manganese composite oxide can be advantageously prepared by calcinating starting material compounds in an atmosphere containing not greater than 10% oxygen, under a reduced pressure, or in a vacuum. If the starting materials are to be calcinated in a reducing atmosphere, the calcination temperature can be further lowered.

What is claimed is:

1. A nonaqueous secondary battery comprising: a positive electrode; a negative electrode; and a nonaqueous ion conductor;

the negative electrode comprising an active material which contains lithium or enables lithium to intercalate/deintercalate or insertion/desertion;

the positive electrode comprising an active material which is a lithium manganese composite oxide having an X-ray diffraction pattern using a CuKα-ray which shows at least three peaks in the ranges between 15.2° and 15.8°, between 18.8° and 18.8°, and between 24.5° and 25.1°, the ratio of a peak intensity in the range between 27° and 33° to a peak intensity in the range between 15.2° and 15.8° being less than 0.02.

2. A nonaqueous secondary battery of claim 1, wherein the ratio of the peak intensity in the range between 18.8° and 18.8° to that in the range between 15.2° and 15.6° ranges from 0.02 to 1.5.

3. A nonaqueous secondary battery of claim 1, wherein the lithium manganese composite oxide has a composition formula;

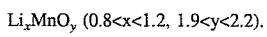

$Li_xMnO_y$ (0.8<x<1.2, 1.9<y<2.2).

4. A nonaqueous secondary battery of claim 1, wherein the negative-electrode active material is a lithium intercalation or insertion carbon material.

5. A nonaqueous secondary battery of claim 1, wherein the active material of the positive electrode is a lithium manganese composite oxide formed by mixing a manganese inorganic compound with a lithium organic or inorganic compound to prepare a lithium manganese compound mixture; and calcinating the lithium manganese compound mixture under the condition at a temperature between about 400° C. and about 2000° C. in an oxidizing or inert atmosphere containing substantially 0% to about 10% by volume of oxygen to obtain lithium manganese composite oxide.

6. A nonaqueous secondary battery of claim 1, wherein the active material of the positive electrode is a lithium manganese composite oxide formed by mixing a manganese inorganic compound with a lithium organic or inorganic compound to prepare a lithium manganese compound mixture; and calcinating the lithium manganese compound mixture under the condition at a temperature of about 250° C. or higher in a reducing atmosphere to obtain lithium manganese composite oxide.

7. A nonaqueous secondary battery of claim 5, wherein the manganese inorganic compound is selected from the group consisting of $MnO_2$ of α-type, β-type, δ-type, γ-type, ε-type, η-type, λ-type, electrolytic type and Ramsdellite type, $Mn_5O_8$, $Mn_2O_3$, MnOOH and $LiMn_2O_4$, and the lithium inorganic or organic compound is selected from the group consisting of lithium chloride, lithium bromide, lithium iodide, lithium hydroxide, lithium oxide, lithium nitrate, lithium carbonate, lithium formate, lithium acetate, lithium lactate, lithium citrate, lithium oxalate, lithium benzoate, lithium pyruvate, lithium stearate, lithium tartrate and $Li_2MnO_3$.

8. A nonaqueous secondary battery of claim 6, wherein the manganese inorganic compound is selected from the group consisting of $MnO_2$ of α-type, β-type, δ-type, γ-type, ε-type, η-type, λ-type, electrolytic type and Ramsdellite type, $Mn_5O_8$, $Mn_2O_3$, MnOOH and $LiMn_2O_4$, and the lithium inorganic or organic compound is selected from the group consisting of lithium chloride, lithium bromide, lithium iodide, lithium hydroxide, lithium oxide, lithium nitrate, lithium carbonate, lithium formate, lithium acetate, lithium lactate, lithium citrate, lithium oxalate, lithium benzoate, lithium pyruvate, lithium stearate, lithium tartrate and $Li_2MnO_3$.

9. A positive electrode comprising active material which is a lithium manganese composite oxide having an X-ray diffraction pattern using a CuKα-ray which shows at least three peaks in the ranges between 15.2° and 15.6°, between 18.6° and 18.8°, and between 24.5° and 25.1°, the ratio of a peak intensity in the range between 27° and 33° to a peak intensity in the range between 15.2° and 15.6° being less than 0.02.

10. A positive electrode of claim 9, wherein the ratio of the peak intensity in the range between 18.6° and 18.8° to that in the range between 15.2° and 15.6° ranges from 0.02 to 1.5.

11. A positive electrode of claim 9, wherein the lithium manganese composite oxide has a composition formula;

$Li_xMnO_y$ (0.8<x<1.2, 1.9<y<2.2).

12. A positive electrode of claim 9, wherein the lithium manganese composite oxide formed by mixing a manganese inorganic compound with a lithium organic or inorganic compound to prepare a lithium manganese compound mixture; and calcinating the lithium manganese compound mixture under the condition at a temperature between about 400° C. and about 2000° C. in an oxidizing or inert atmosphere containing substantially 0% to about 10% by volume of oxygen to obtain lithium manganese composite oxide.

13. A positive electrode of claim 9, wherein the lithium manganese composite oxide formed by mixing a manganese inorganic compound with a lithium organic or inorganic compound to prepare a lithium manganese compound mixture; and calcinating the lithium manganese compound mixture under the condition at a temperature of about 250° C. or higher in a reducing atmosphere to obtain lithium manganese composite oxide.

14. A positive electrode of claim 9, wherein the manganese inorganic compound is selected from the group consisting of $MnO_2$ of α-type, β-type, δ-type, γ-type, ε-type, η-type, λ-type, electrolytic type and Ramsdellite type, $Mn_5O_8$, $Mn_2O_3$, MnOOH and $LiMn_2O_4$, and the lithium organic or inorganic compound is selected from the group consisting of lithium chloride, lithium bromide, lithium iodide, lithium hydroxide, lithium oxide, lithium nitrate, lithium carbonate, lithium formate, lithium acetate, lithium lactate, lithium citrate, lithium oxalate, lithium benzoate, lithium pyruvate, lithium stearate, lithium tartrate and $Li_2MnO_3$.

* * * * *